No. 741,347. PATENTED OCT. 13, 1903.
C. M. LAMB.
WIRE SPLICE AND METHOD OF PRODUCING SAME.
APPLICATION FILED AUG. 28, 1902.
NO MODEL.
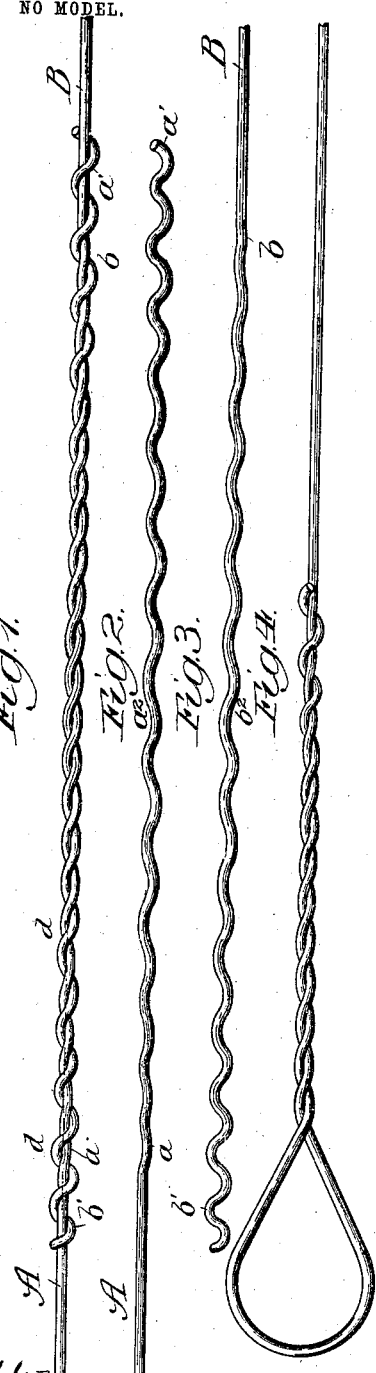
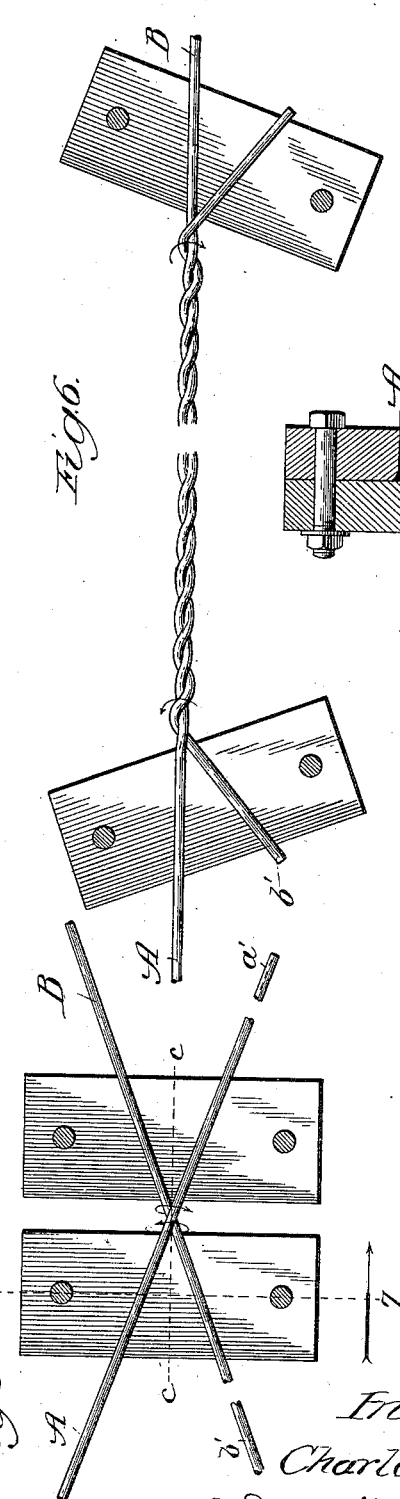
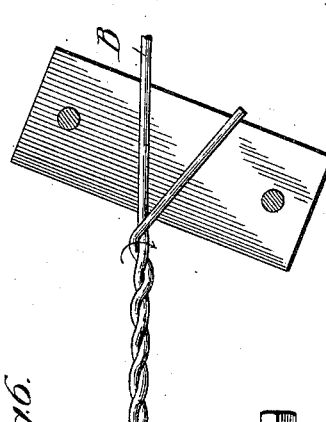
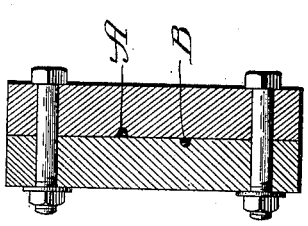

No. 741,347. Patented October 13, 1903.

UNITED STATES PATENT OFFICE.

CHARLES M. LAMB, OF MONESSEN, PENNSYLVANIA, ASSIGNOR TO PAGE WOVEN WIRE FENCE COMPANY, OF ADRIAN, MICHIGAN, A CORPORATION OF NEW JERSEY.

WIRE SPLICE AND METHOD OF PRODUCING SAME.

SPECIFICATION forming part of Letters Patent No. 741,347, dated October 13, 1903.

Application filed August 28, 1902. Serial No. 121,305. (No model.)

*To all whom it may concern:*

Be it known that I, CHARLES M. LAMB, a citizen of the United States, residing at Monessen, in the county of Westmoreland and State of Pennsylvania, have invented a new and useful Improvement in Wire Splices and Methods of Producing the Same, of which the following is a specification.

My invention relates particularly to a splice for fence-wires and the like where the wires are subjected to great tension.

My primary object is to provide a splice of moderate length possessing greater strength than the tensile strength of the wire itself.

The term "splice" is meant to include an "eye-splice," whether for use as a loop at the end of a strand or for the purpose of increasing the length of a strand.

The improved splice and method of producing the same are illustrated in the accompanying drawings, in which—

Figure 1 represents a splice serving to join two wires; Figs. 2 and 3, views of the wires of the splice separated; Fig. 4, a view of an eye-splice which may serve either in producing a strand of greater length or as an end loop for a strand; and Figs. 5 to 7, inclusive, views illustrating the method of forming the splice.

Referring to the figures, excepting Fig. 4, A B represent wires having spiral convolutions commencing at points $a$ and $b$ and terminating at the extremities $a'$ $b'$ of the wires. The convolutions are formed by twisting the wires upon each other in a peculiar manner, so that they are caused to interlock and grip each other in a specially-effective manner. Observing the wire A, for instance, it will be noted that the convolutions increase in diameter from the point $a$ to near the extremity $a'$, while at the same time the angle of the spiral with reference to a longitudinal center line increases. Similarly, the convolutions of the wire B increase in diameter from the point $b$ to near the extremity $b'$, and the spirals increase in angle with relation to a center line. Also the pitch of the spirals increases somewhat (here shown exaggeratedly) from the ends thereof to the centers $a^2$ $b^2$, though this is not essential.

One means of carrying out the improved method is illustrated in Figs. 5 to 7, inclusive. Two dies or twisting devices with convergent channels are placed edge to edge, and the wires are passed through them, so as to cross each other, as shown in Fig. 5. The dies are then rotated in opposite directions, as indicated by the small arrows. At the beginning of the movement the axis of rotation for both dies is the line $c\,c$. As the dies separate, which they are permitted to do under the force exerted upon them by the spirals being formed, they are mechanically shifted, so as to cause the main wires to approach the axis of rotation, while the extremities are carried farther and farther from the axis of rotation. In other words, the angle between the main wires and the axis of rotation approach zero, while the angle between the extremities and the axis of rotation approach a maximum— viz., the size of the angle between a main wire and the adjacent extremity. Now it will be observed that the effect of increasing the angle of the spiral with relation to the axis of rotation (assuming a constant diameter) is to decrease the pitch, while the effect of increasing the diameter (assuming a constant angle) is to increase the pitch. In the drawings the spirals are assumed to vary practically continuously from centers to ends; but this seems non-essential, as appears from the fact that at each point in the splice where a spiral appears in each wire we have a spiral of one angle working upon a spiral of another angle. This would be the case even if the pitch did not change, which would probably result if the right rate of change in diameter of spirals attended the change in angle of the wires with relation to the axis of rotation. However this may be, the result of varying the angles as the coiling progresses is to produce interlocking shoulders throughout the length of the splice, which virtually gives the effect at each point of a thread of one pitch endeavoring to work in a thread of different pitch. Preferably the winding of the extremities is continued for a turn or two after the main wires have come into coincidence with the axis of rotation, as shown in Fig. 6. The angle between the members being twisted together remains a constant, as is obvious. The eye-splice shown in Fig. 4 has the same characteristics, corresponding as it does with one-half of the splice shown in Fig. 1. Where lengths of wire fence are to be joined, key-ring fence connections may be used to join the corresponding loops or eyes together.

The gist of my invention resides in the variation of the angle of the interlocking spirals with relation to the central axis of the splice. The precise manner and rate of changing these angles may vary without departure from my invention. Also the exact manner in which the curvature of the wires is effected by the continual bending of one to bring it into coincidence with the axis of rotation and of the other to carry it farther from the axis of rotation need not be considered.

What I regard as new, and desire to secure by Letters Patent, is—

1. The method of forming a wire splice, which consists in crossing the members entering into the splice, subjecting both members to a coiling action, and varying the angle of the members with reference to the axis of rotation as the coiling operation progresses.

2. The method of forming a wire splice, which consists in crossing the members entering into the splice, subjecting both members to a coiling action, and varying the angle of the members with reference to the axis of rotation as the coiling operation progresses while maintaining said members at a given angle to each other.

3. The method of forming a wire splice which consists in crossing the members at a given angle, subjecting both members to a twisting operation about an imaginary axis bisecting said angle, and decreasing the angle of one member with reference to said axis and increasing the angle of the other member with reference to said axis as the twisting operation progresses.

4. The method of forming a wire splice which consists in crossing the wires at a given angle, twisting the wires about each other at a central imaginary axis, and gradually varying the angle between each wire and said axis as the twisting operation progresses.

5. The method of forming a wire splice which consists in crossing the wires at a given angle, twisting the wires about each other at a central imaginary axis and gradually lessening the angle of one wire with reference to said axis and correspondingly increasing the angle of the other wire with reference to said axis as the twisting operation progresses.

6. The method of forming a wire splice, which consists in crossing two wires near their ends, twisting both wires about a common axis on both sides of the point of crossing, and varying the angles of the wires with reference to the axis of rotation as the twisting operation progresses.

7. A wire splice, comprising interlocking spiral coils presenting to each other at contacting points different angles with relation to a center axis.

8. A wire splice, comprising two interlocking coils composed of reversely-varying interlocking spirals, for the purpose set forth.

9. A wire splice, comprising two coils with a plurality of tightly-interlocking spiral sections presenting to each other at contacting points different angles with relation to a center axis.

10. A wire splice, comprising two interlocking coils, each composed of spiral sections presenting to each other at points of contact different angles with reference to a central axis and having varying pitches, the adjacent spiral sections of the two coils interlocking, for the purpose set forth.

11. A wire splice, having reversely-arranged interlocking coils, each varying in diameter from one end to the other.

12. A wire splice having interlocking coils, each comprising oppositely-arranged spiral sections with progressively-decreasing angles and progressively-decreasing diameters, for the purpose set forth.

13. A wire splice, comprising interlocking oppositely-arranged coils, each having spiral sections of successively-enlarging diameter and increasing angles, in passing from base to extremity, for the purpose set forth.

CHARLES M. LAMB.

In presence of—
S. F. LOEB,
A. B. COUGHANOUR.